United States Patent
Best et al.

(10) Patent No.: US 7,992,022 B2
(45) Date of Patent: Aug. 2, 2011

(54) METHOD AND APPARATUS FOR SETTING COMPUTER-WORKING-HOURS-BASED SHUTDOWN OPTIONS

(75) Inventors: Steve Best, Acton, MA (US); Hui J. He, Beijing (CN); Kuang Hu, Beijing (CN); Zhi H. Pan, Beijing (CN); Guo J. Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 12/104,765

(22) Filed: Apr. 17, 2008

(65) Prior Publication Data

US 2009/0265535 A1    Oct. 22, 2009

(51) Int. Cl.
  *G06F 1/26* (2006.01)
  *G06F 1/32* (2006.01)
  *G06F 1/00* (2006.01)
(52) U.S. Cl. ...................................... 713/320
(58) Field of Classification Search .................. None
  See application file for complete search history.

(56) References Cited

U.S. PATENT DOCUMENTS

| | | | | |
|---|---|---|---|---|
| 5,542,035 A | * | 7/1996 | Kikinis et al. | 713/323 |
| 5,918,059 A | | 6/1999 | Tavallaei et al. | |
| 6,115,824 A | * | 9/2000 | Ha | 713/330 |
| 6,654,895 B1 | | 11/2003 | Henkhaus et al. | |
| 6,961,859 B2 | * | 11/2005 | Derocher et al. | 713/320 |
| 7,593,355 B1 | * | 9/2009 | Surazski et al. | 370/261 |

FOREIGN PATENT DOCUMENTS

CN    1372191 A    10/2002

OTHER PUBLICATIONS

China Office Action, 100034, Dated Mar. 1, 2011, 5 pages, untranslated copy provided.

* cited by examiner

*Primary Examiner* — Thomas Lee
*Assistant Examiner* — Phil Nguyen
(74) *Attorney, Agent, or Firm* — Daniel McLoughlin; Hoffman Warnick LLC

(57) ABSTRACT

The present invention provides a method and apparatus for setting computer-working-hours-based shutdown options. A method for setting computer-working-hours-based shutdown options in accordance with an embodiment includes: when receiving a shutdown command from a user, determining, based on a setting of computer working hours by the user, whether a current time of the system is within the working hours of the computer; and performing at least one of setting a shutdown option according to the determination result and presenting a shutdown option according to the determination result.

15 Claims, 8 Drawing Sheets

METHOD AND APPARATUS FOR SETTING COMPUTER-WORKING-HOURS-BASED SHUTDOWN OPTIONS

TECHNICAL FIELD

The present invention relates to the computer field, and particularly to a method and apparatus for setting computer-working-hours-based shutdown options.

BACKGROUND ART

Currently, most people are very familiar with the shutdown options of an operating system. In general, the shutdown options of an operating system have the following options to select from: Turn off, Restart and Log out, as well as a "Standby" option. Among these options, what are frequently used are Turn Off and Restart. If a user wants to leave work to go home and will not use his machine for a rather long time, he would turn off his computer. During working hours, a user often restarts the computer to validate some setting changes or to wake up a non-responding machine.

The shutdown option scheme of existing operating systems can be categorized into two types according to their default shutdown options.

The first type is the fixed default option scheme. For example, in some operating systems, "standby" is always the default option. In other operating systems, once the user clicks "Log out", "Log out" will be the default option. A fixed default option is also used, in which the option selected most recently by the user is remembered.

FIG. 1 shows a schematic diagram of the shutdown subsystem of an operating system using the fixed default shutdown option scheme and the related hardware architecture. FIG. 2 shows a shutdown operation flow using the fixed default option scheme. As shown in FIGS. 1 and 2, a shutdown option list and specified fixed default shutdown option are stored in the system memory. After the user executes a shutdown operation through an input device such as a keyboard, a mouse or a shutdown button of the computer, the shutdown subsystem in the operating system will receive a shutdown signal through the bus controller, the CPU etc., and then obtain the stored shutdown option list and the fixed default shutdown option from the memory. The shutdown subsystem will set the fixed default shutdown option in the shutdown option list, and present to the user through a device such as a display, etc., a shutdown interactive window containing a shutdown option list that has been set with the fixed default shutdown option, so as to further execute a corresponding shutdown option operation or other operations according to the user's selection.

FIG. 3 shows a schematic diagram of the shutdown subsystem of an operating system using a default shutdown option scheme of remembering the latest shutdown option and the related hardware architecture. FIG. 4 shows a shutdown operation flow of the default shutdown option scheme of remembering the latest shutdown option scheme. As shown in FIGS. 3 and 4, a shutdown option list and the latest shutdown option selected by the user are stored in the system memory. After a user executes a shutdown operation through an input device such as a keyboard, a mouse or a shutdown button of a computer, the shutdown subsystem in the operating system receives a shutdown signal through the bus controller, the CPU etc., and then obtain the stored shutdown option list and the stored latest shutdown option selected by the user from the memory. The shutdown subsystem sets the latest shutdown option in the shutdown option list as the default shutdown option, and present to the user through a device such as a display, etc., a shutdown interactive window containing a shutdown option list that has been set with the default shutdown option, so as to further execute a corresponding shutdown option operation or other operations according to the user's selection. When the user selects in the shutdown interactive window to execute some shutdown option operation such as shutdown, restart, logout, and standby, etc., the shutdown subsystem updates the stored latest shutdown option with the shutdown option selected by the user, and then executes the shutdown option operation selected by the user. When the user does not select to execute a shutdown option operation, and instead executes an operation such as cancel, etc., the operating system executes a corresponding operation and does not store and update the latest shutdown option.

Although the above mentioned current shutdown option schemes are simple and direct, they do not provide a more human usability to the end user. It is not an on-demand solution, thus is not convenient for the user to use. In most cases, both the fixed default option and the default option of remembering the latest option cut off the relationship between shutdown options and user's current intention, are not what the user wants, and the user has to specify one option according to his intention. The scheme of the fixed default option only represents an initial setting, and does not reflect the current intention of the user. The scheme of remembering the latest option only represents the intention of the user when he shut down last time, and also does not represent the current intention of the user.

In an enterprise environment, a workstation generally keeps running in working hours. When a user presses the shutdown button after some settings, his intention often is to restart the computer to validate the settings. While in non-working hours, when the user press the shutdown button, this usually means the user has completed the work and wants to shut down the computer. Since the two default shutdown option schemes in the prior art do not consider and utilize the difference between the shutdown options usually used during working hours and non-working hours of the computer, they can not provide to the user a better shutdown experience.

In addition, when the user is installing an application program, the computer is frequently restarted, which in general is performed by the application program. The application program needs to query the user's opinion, and only after the user agrees that the computer can be restarted repeatedly, the application program can change the setting of the default shutdown option and restart the computer. After the installation is completed, the application program further needs to restore the original default shutdown option setting, and such a modification of the shutdown option setting brings trouble to the design of the application program; and if the user is absent, the installation program can only wait for the agreement of the user and can do nothing.

Therefore, there is needed a computer-working-hours-based shutdown option setting method and apparatus in the technical field.

SUMMARY OF INVENTION

In order to overcome the above and other defects of the operating system shutdown schemes in the prior art, the present invention is proposed.

According to an aspect of the present invention, there is provided a method for setting computer-working-hours-based shutdown options, comprising: when receiving a shutdown command from a user, determining, based on a setting of the computer working hours by the user, whether a current time of the system is within the working hours of the computer; and performing at least one of setting a shutdown option according to the determination result and presenting a shutdown option according to the determination result.

According to another aspect of the present invention, there is provided an apparatus for setting computer-working-hours-based shutdown options, comprising: means for, when receiving a shutdown command from a user, determining, based on a setting of the computer working hours by the user, whether a current time of the system is within the working hours of the computer; and means for performing at least one of setting a shutdown option according to the determination result and presenting a shutdown option according to the determination result.

According to a further aspect of the present invention, there is provide a computer program product stored on a computer readable medium, which when executed, sets computer-working-hours-based shutdown options, the computer readable medium comprising program code for: when receiving a shutdown command from a user, determining, based on a setting of computer working hours by the user, whether a current time of the system is within the working hours of the computer; and performing at least one of setting a shutdown option according to the determination result and presenting a shutdown option according to the determination result.

Compared to the prior art, the method and apparatus of the present invention can configure the shutdown options of an operating system in a manner closer to the user's intention. It provides a on-demand default shutdown option sensitive to working hours by customization of the working hours of the machine, thus providing a better user experience.

In addition, since a user generally installs an application program during working hours, after employing the present invention, when the installation of an application programs starts the computer frequently, the design of the application program needs not change the shutdown option settings, and can directly use the functions of the present invention provided by the system, thus simplifying the design of installations of application programs. Furthermore, during working hours, when the user is absent, after storing the state of the software the user is using, the application program can restart the computer directly according to system setting by using the functions of the present invention, and then restore the state of the software that was being used, thus saving the time of the user and providing a better user experience.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION OF THE INVENTION

Figure 1:
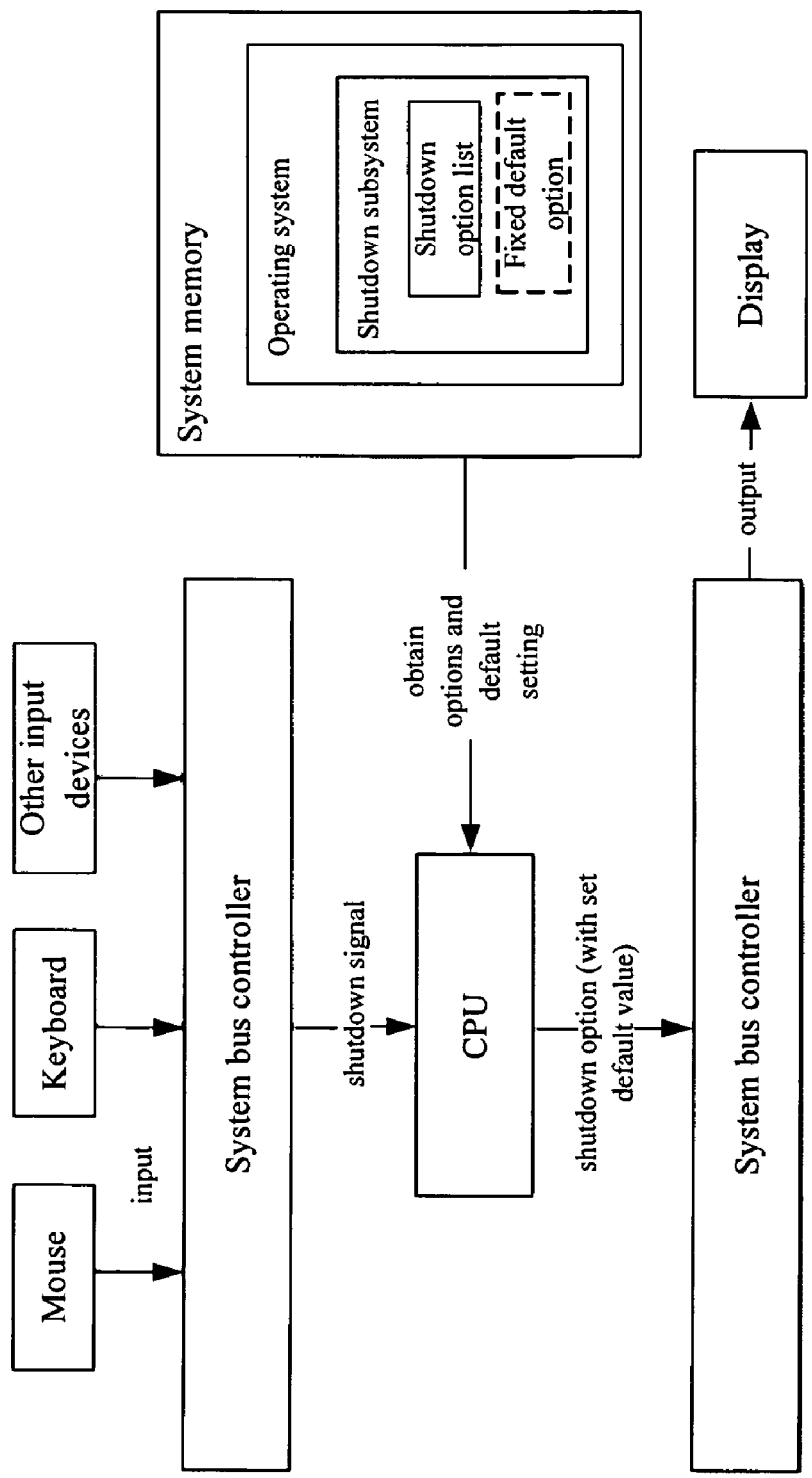
FIG. 1 shows a schematic diagram of the shutdown subsystem of an operating system using the fixed default shutdown option scheme and the related hardware architecture.
Figure 2:
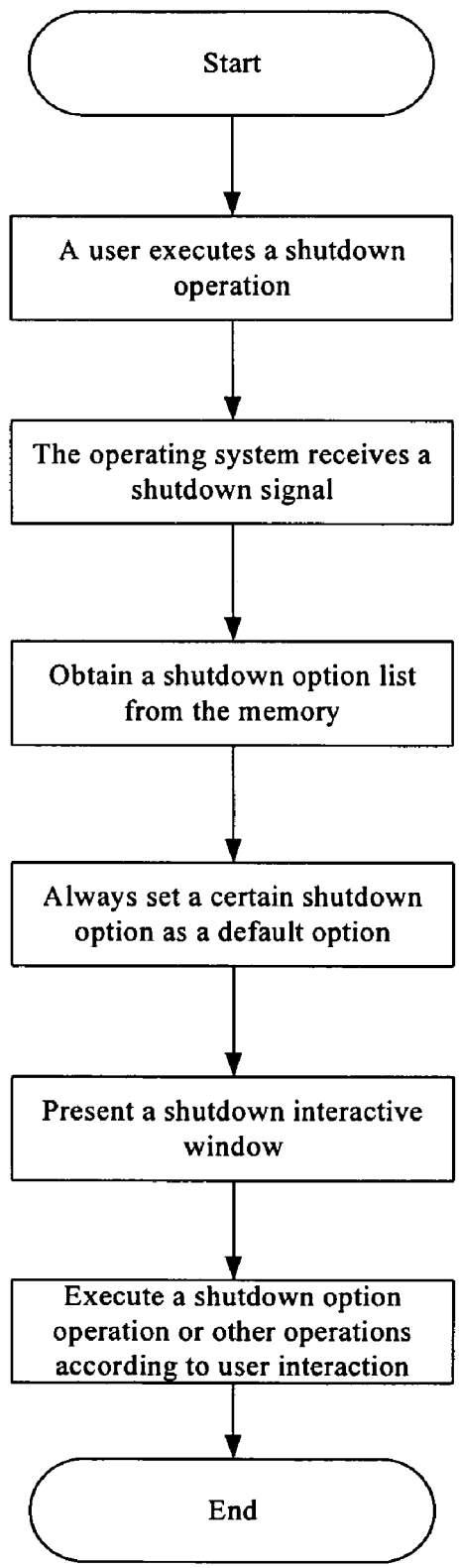
FIG. 2 shows a shutdown operation flow using the fixed default option scheme.
Figure 3:
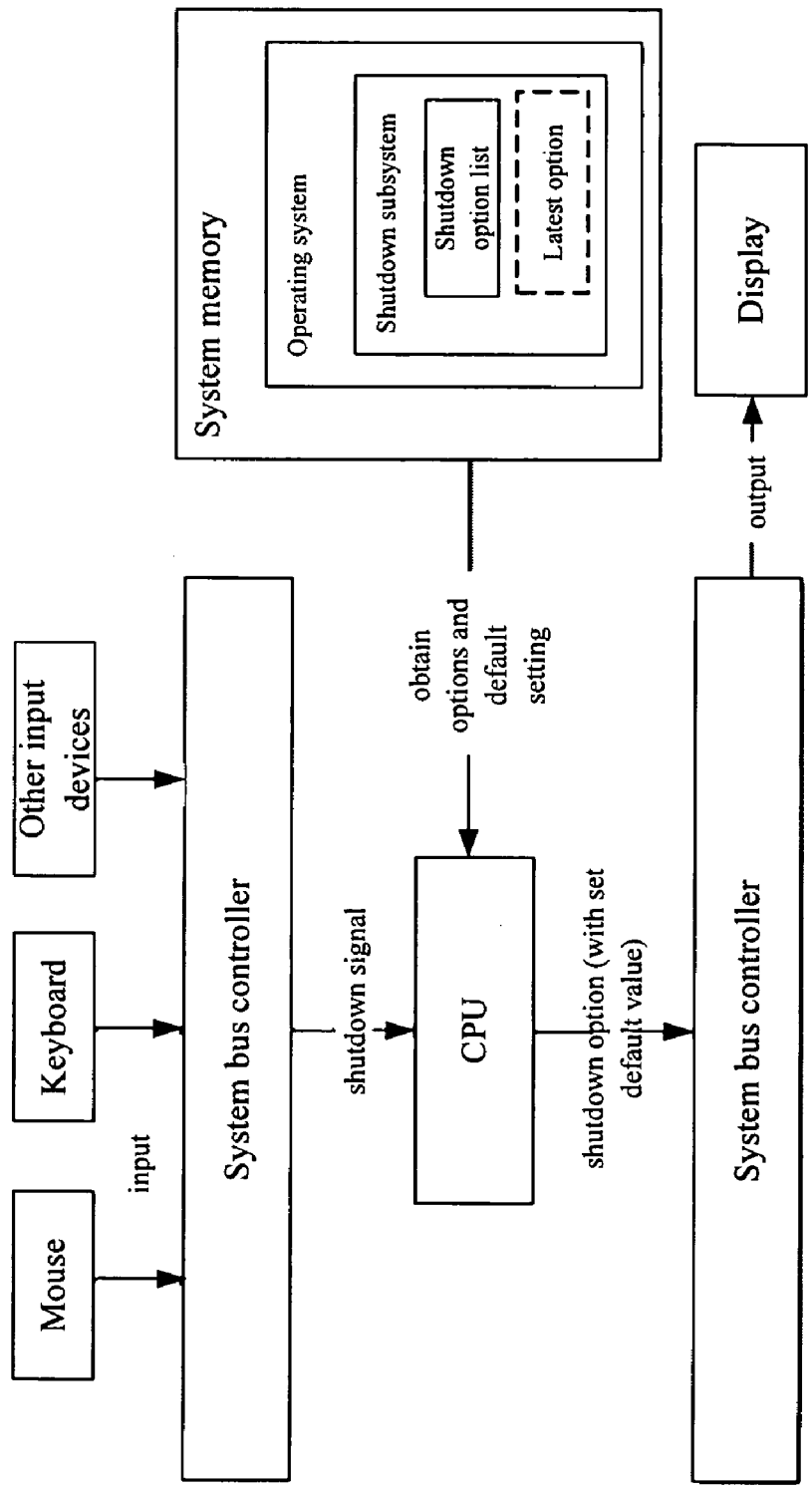
FIG. 3 shows a schematic diagram of the shutdown subsystem of an operating system using a default shutdown option scheme of remembering the latest shutdown option and the related hardware architecture.
Figure 4:
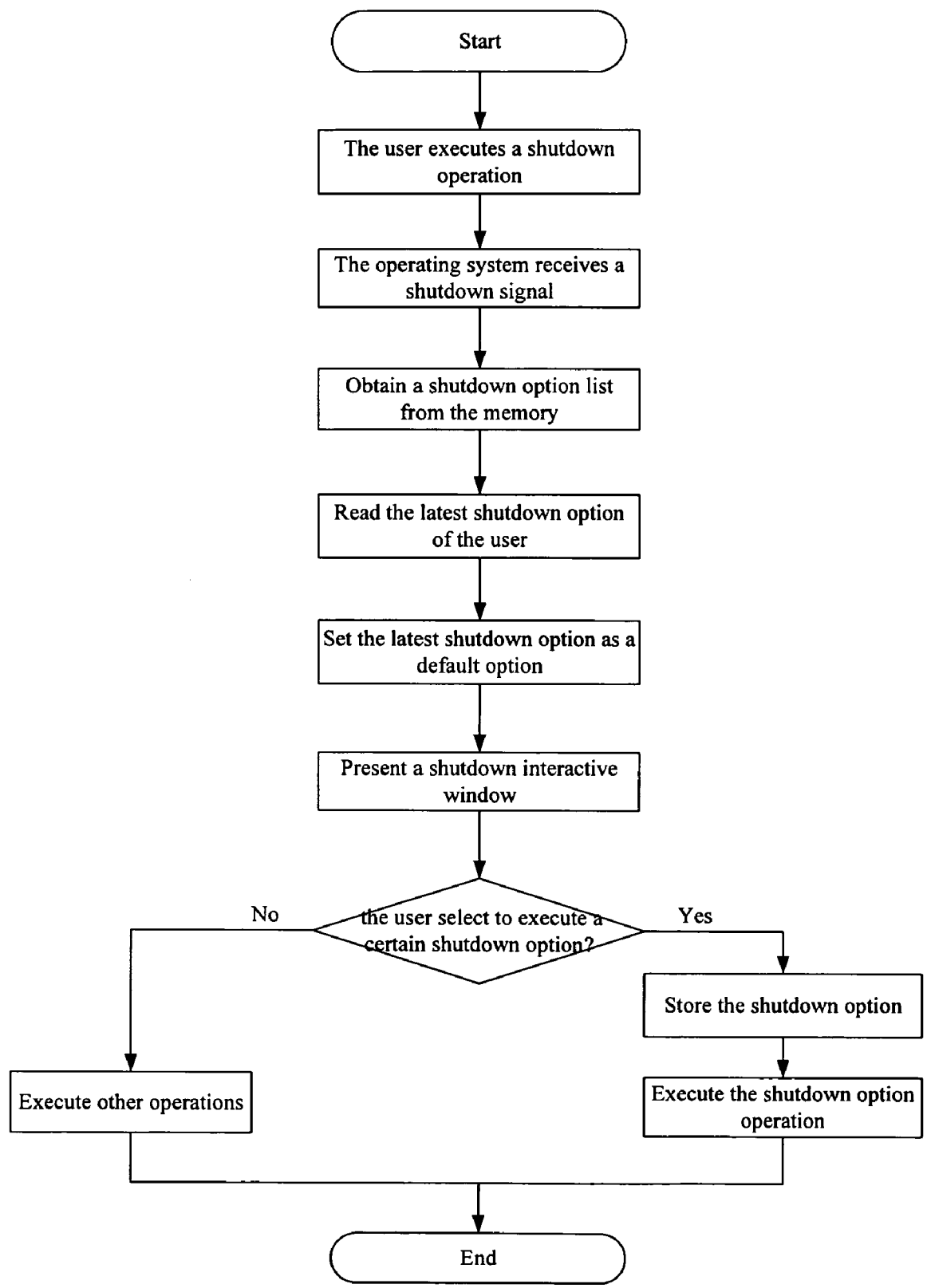
FIG. 4 shows a shutdown operation flow of the default shutdown option scheme of remembering the latest shutdown option.

The method and apparatus for setting computer-working-hours-based shutdown options according to the present invention are an improvement to the shutdown options of an operating system. They provide an intelligent shutdown scheme for an operating system. In an embodiment of the present invention, the shutdown subsystem of a target operating system is improved. In the improved shutdown subsystem, a user can set a working hours range in advance. If receiving a shutdown signal, the shutdown subsystem will obtain the system time of the current moment, compare it with the working hours range, and set and/or present different default options and/or shutdown options according to the comparison result. If the current time is in working hours, the default option may, for example, be set to be "restart"; and if the current time is not in the working hours, the default option may, for example, be set to be "shutdown".

The method and apparatus for setting computer-working-hours-based shutdown options according to the present invention can be applied to various computing devices such as a desktop computer, a server, a handheld computer, etc., and can be applied to various different operating systems.

The present invention can be implemented in hardware, firmware, software or any combination thereof. The present invention can be implemented in a single computer system in a centralized manner, or in a distributed manner in which different components are distributed in a plurality of interconnected computer systems. Any computer systems or other devices suitable for the various methods described herein are applicable. A typical combination of hardware and software can be a general-purpose computer system having a computer program, which, when being loaded and executed, controls the computer system to execute various steps of the method described herein.

The present invention can be embodied in a computer program product, which contains all the features enabling the implementation of the methods described herein, and when being loaded into a computer system, can execute the methods.

The method and apparatus for setting computer-working-hours-based shutdown options according to the embodiment of the present invention will be described hereinafter with reference to the drawings. Throughout the drawings, like parts are identified by like reference numerals.

Figure 5:
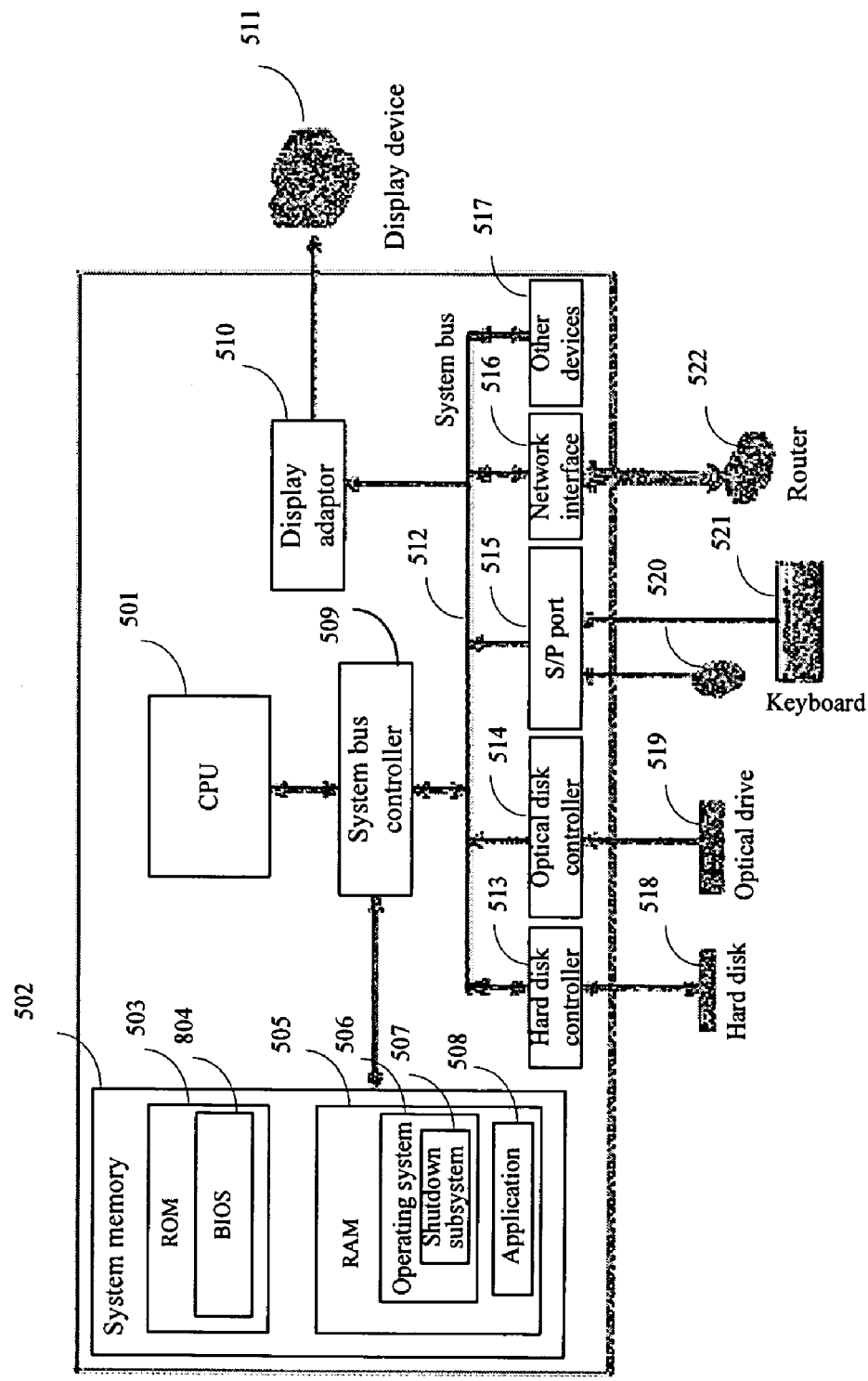
FIG. 5 shows an example of a computer system to which the present invention can be applied.

FIG. 5 shows an example of a computer system in which the present invention can be applied. As shown in FIG. 5, the computer system comprises a CPU 501, and a display adaptor 510, a system memory 502, a hard disk controller 513, an optical disk controller 514, a serial/parallel port 515, a network interface 516, and other devices 517 connected to the CPU through a system bus controller 509 and a system bus 512. Herein, the system memory 502 comprises an ROM 503 and an RAM 505. The ROM 503 contains the BIOS 504 of the computer. The RAM 505 contains a loaded operating system 506 and an application program 508. The operating system 506 contains an improved shutdown subsystem 507 according to an embodiment of the present invention. In addition, a hard disk 518 is connected to the hard disk controller 513, an optical drive 519 is connected to the optical controller 514, input devices such as a mouse 520 and a keyboard 521, etc., are connected to the serial/parallel port 515, a network device such as a router is connected to a network interface 516 through a network, and a display device 511 is connected to the display adaptor 510.

In an embodiment of the present invention, the functional modules of the apparatus for setting computer-working-hours-based shutdown options are contained in a shutdown subsystem 507 in the operating system 506 in the form of software. When the software functional modules of the apparatus for setting shutdown options of the present invention are loaded into the RAM 505 of the computer system along with the operating system and the shutdown subsystem therein and executed by CPU 501, the various software functional modules of the apparatus for setting shutdown options of the present invention and computer components such as the CPU 501, the system memory 502, the system bus controller 509, the system bus 512 and various input and output devices constitute the shutdown option setting apparatus according to an embodiment of the present invention, and execute the various steps in the method for setting shutdown options according to an embodiment of the present invention.

It is to be noted that, what is shown in the drawings and described in the above is only an example of a computer system in which the present invention can be implemented, and not a limitation to a computer system in which the present invention can be implemented. The computer system in which the present invention can be implemented can have more, less and different components as compared to what is shown in the drawings and described in the above.

Figure 6:
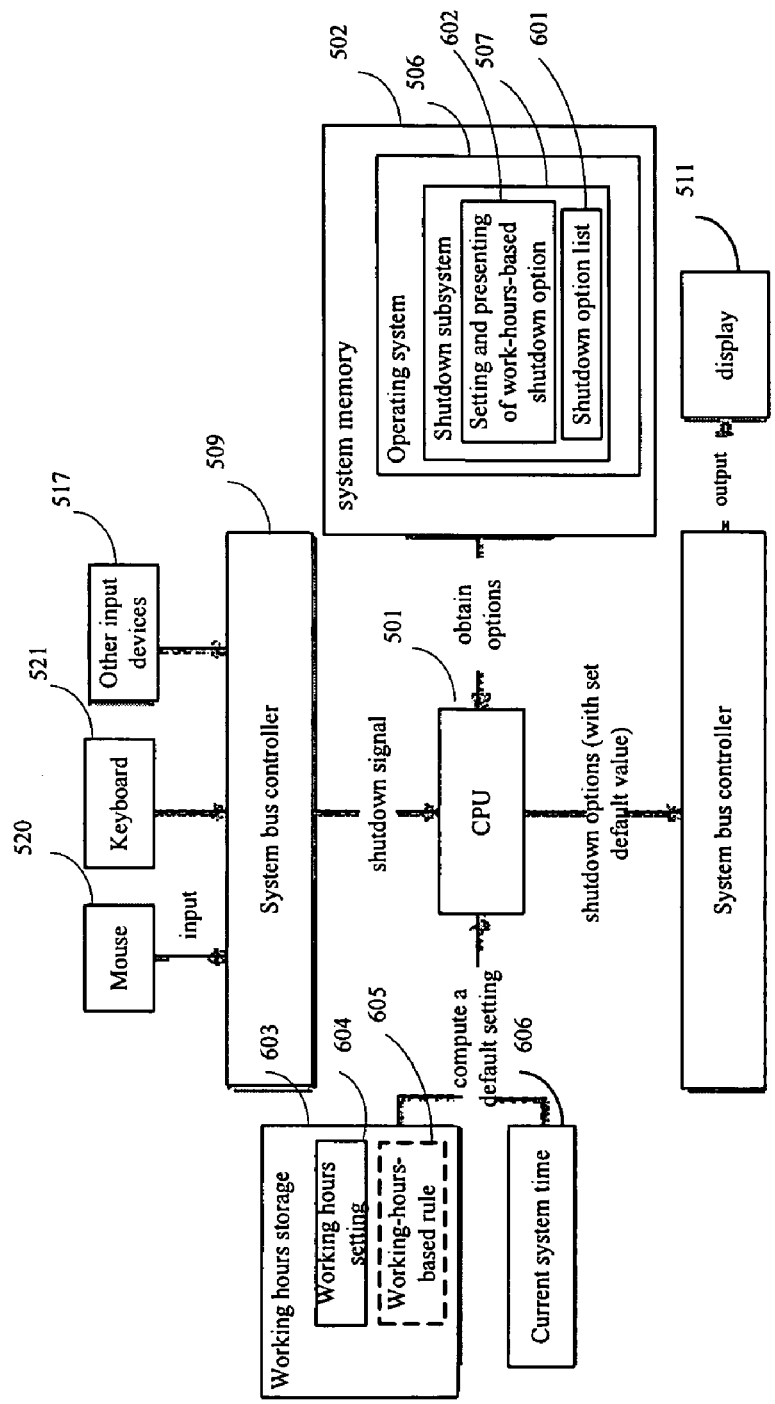
FIG. 6 shows a schematic diagram of the improved shutdown subsystem of an operating system and the related computer hardware architecture according to an embodiment of the present invention.

FIG. 6 shows a schematic diagram of the improved shutdown subsystem of an operating system and the related computer hardware architecture according to an embodiment of the present invention. As shown in FIG. 6, as in the prior art, a shutdown option list 601 is stored in the shutdown subsystem 507 of the operating system 506. However, different from the prior art, various software functional modules 602 for computer-working-hours-based shutdown option setting of the present invention are added into the shutdown subsystem 507 of the operating system 506. In addition, a working-hours storage 603 is also added for storing working-hours setting 604. The working-hours storage 603 may contained in a permanent storage such as a hard disk 518 of the computer system. The user can operate the software functional modules 602 for computer-working-hours-based shutdown option setting of the present invention through input devices such as a mouse 520, a keyboard 521, etc., output devices such as a display 511, etc, and computer hardware components such as the CPU 501, so as to set the working hours of the computer system and optionally set a rule based on working hours.

The set working hours 604 and optional working-hours-based rule 605 may be stored in the working-hours storage 603 by the software functional modules 602 for computer-working-hours-based shutdown option setting of the present invention through a computer hardware component such as CPU 501, etc. Afterwards, when the user issues a shutdown signal through input devices such as the mouse 520, the keyboard 521 etc., the software functional modules 602 for computer-working-hours-based shutdown option setting of the present invention obtain the stored working hours setting 604 and optionally the working-hours-based rule from the working-hours storage 603 through computer hardware components such as CPU 501, etc., obtain the current system time 606, compare them to determine whether the current system time is within the set and stored computer working hours, set a default display option in the shutdown option list 601 obtained from the system memory 502 according to the determination result and the obtained or built-in working-hours-based rule, and present to the user through a display, etc., a user interactive window containing the shutdown option list that has been set with the default display option, so that the user can select to execute shutdown option operations such as shutdown, restart, logout and standby, etc, or execute other operations such as a cancel operation, etc.

Figure 7:
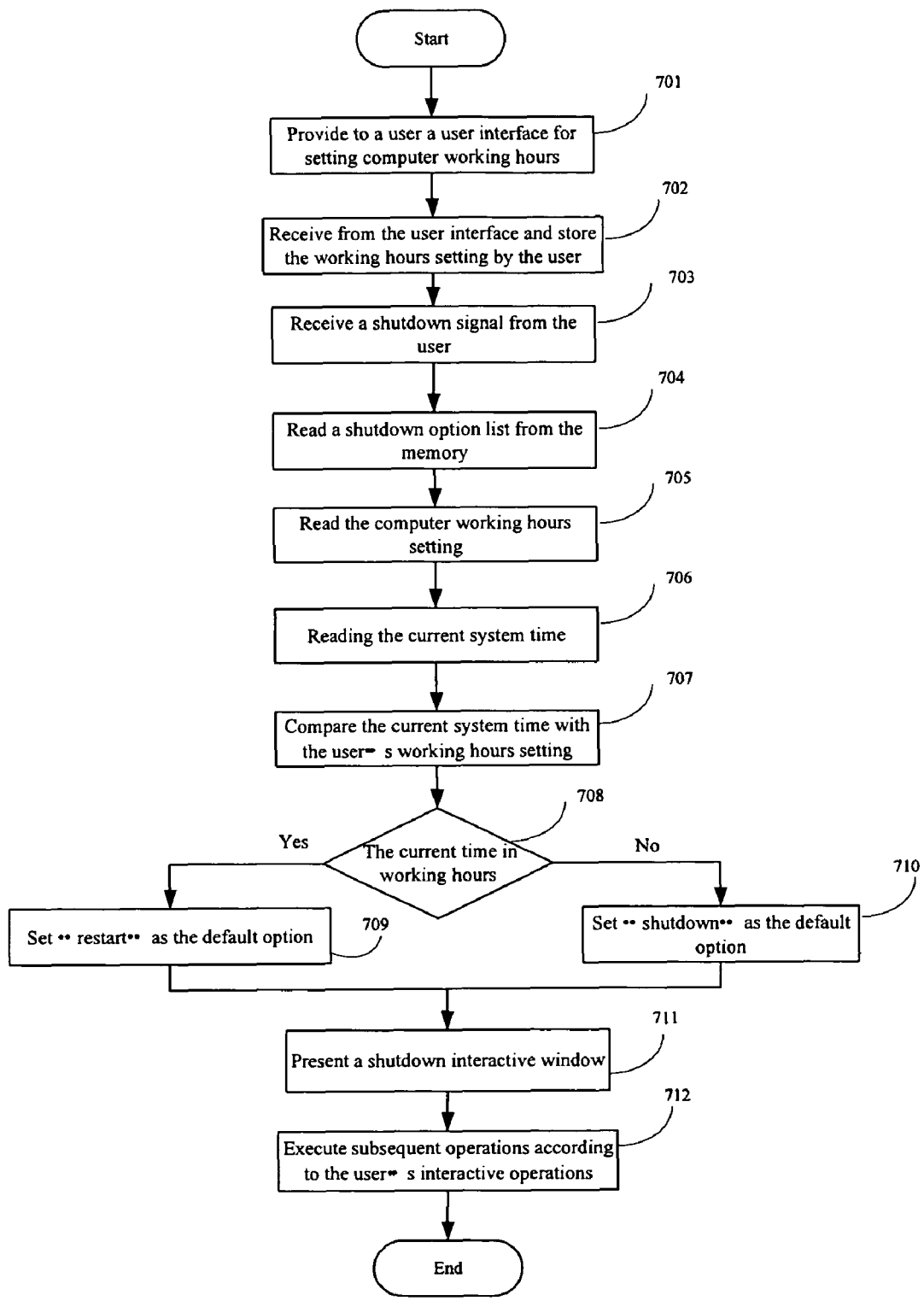
FIG. 7 shows a flowchart of a working-hours-based shutdown option setting method according to an embodiment of the present invention.

FIG. 7 shows a flow chart of a method for setting working-hours-based shutdown options according to the embodiment of the present invention. As shown in FIG. 7, at step 701, a user interface for setting computer working hours is provided to the user. This can be implemented either by providing a separate user interactive window for setting computer working hours or a command or program in a command line interface in the operating system, in which case, when the user invokes the command or executes the program, the operating system presents to the user a user interactive window or a command line interface for setting computer working hours; or by providing directly a command or program for setting computer working hours in the operating system, in which case, the user can perform the setting of computer working hours by executing the command or program with specific parameters in the command line interface of the operating system directly; and by providing a button for setting computer working hours in the original shutdown user interactive window of the operating system, and when the user clicks the button, popping up a window for setting the computer working hours by the operating system.

Optionally, during step 701 or before or after step 701, a user interface for setting a shutdown option setting rule based on the computer working hours is provided to the user, who can set a shutdown option setting rule based on the computer working hours through the user interface. The rule can provide, for example, that when the computer is within the working hours, when receiving a shutdown signal from the user, a certain shutdown option is set as a default shutdown option, and when the computer is out of the working hours, when receiving a shutdown signal from the user, another shutdown option is set as a default shutdown option. In an embodiment of the present invention, the computer-working-hours-based shutdown option setting rule is built in the shutdown option setting apparatus according to present invention, and it provides that when the computer is within the working hours, when receiving a shutdown signal from the user, "restart" is set as a default shutdown option; when the computer is out of the working hours, when receiving a shutdown signal from the user, "shutdown" is set as a default shutdown option. Thus, in this embodiment, there are no steps of providing to the user a user interface for setting a shutdown option setting rule based on the computer working hours, and receiving from the user and storing the shutdown option setting rule based on the computer working hours.

At step 702, the setting of computer working hours by the user is received from the user interface and stored. For example, the user interface may comprise a window containing two time pickers, a "submit" button and a "cancel" button. When the user selects a desired times from the two time pickers and clicks the "submit" button, the time range defined by the two times is taken as the working hours of the computer and stored. In addition, a date picker and other editable controls can be provided in the window so as to perform more complicated customization on the computer working hours, for example, excluding legal holidays from the computer working hours, etc. The computer working hours setting received from the user interface is stored in a permanent storage such as a hard disk, etc.

For example, a user can set 9:00 to 18:00 of working days (from Monday to Friday) as his workstation's working hours, and store the setting into a permanent storage. Later, if the user changes a system setting for some requirements during work and presses the shutdown button, the operating system will pop up a shutdown option window, and make "Restart" as the default option therein. If the user presses the shutdown button at 18:10 after one day's work, the operating system will set "TurnOff" as the default option in the shutdown option window popped up.

For another example, machines used as servers need to run all the time. In this case, the user can set its working hours as 0:00~24:00. Thus, each time the user presses the shutdown button, "Restart" will always be displayed as the default option.

In alternative embodiments of the present invention, during step 702 or before or after the step 702, the computer-working-hours-based shutdown option setting rule set by the user in step 701 is received and stored.

After setting the computer working hours, during the running of the computer, at step 703, a shutdown signal is received from the user. This is either because the user presses the shutdown button, or because the user sends a shutdown command by clicking a shutdown menu item in the user interface of the operating system.

At step 704, a shutdown option list is read from the shutdown subsystem of the operating system in the system memory. As known by those skilled in the art, the shutdown option list is generally located in a fixed position depending on a specific operating system.

At step 705, a computer working hours setting stored in the permanent storage at step 702 is read.

At step 706, the current system time is read. As known by those skilled in the art, the current system time can be read, for example, by invoking a command or function specific to an operating system.

At step 707, the current system time obtained at step 706 is compared with the computer working hours setting obtained at step 705, so as to determine whether the current system time falls within the set computer working hours.

At step 708, it is determined whether the current system time falls within the set computer working hours. If the determination is Yes, then step 710 is executed. If the determination is No, step 709 is executed.

At step 709, according to an embodiment of the present invention, "restart" in the shutdown option list obtained in step 704 is set as a default option.

At step 710, according to an embodiment of the present invention, "shutdown" in the shutdown option list obtained in step 704 is set as a default option.

In alternative embodiments of the present invention, different shutdown options can be set as the default option or different configurations can be performed on the shutdown options of the operating system, such as displaying different shutdown options, etc., at step 709 and step 710, respectively, according to the determination result in step 708 and optionally the computer-working-hours-based shutdown option setting rule stored at step 702.

At step 711, a shutdown interactive window is presented to the user, which window contains the shutdown option list which has been set with a default shutdown option at step 709 or step 710, so that the user can select therefrom to execute a desired shutdown option operation, such as shutdown, restart, logout, standby, etc.

Because a default shutdown option has been set in the presented shutdown option list according to whether the current system time is within the set computer working hours, and in most cases the user will select a default shutdown option according to whether the current system time is within the set computer working hours, the computer-working-hours-based shutdown option setting method of the present invention improves the user's experience. Although occasionally the user needs to shut down workstations or servers in working hours or restart workstations in non-working time, those events seldom occur. And in such a case, the user can directly select to execute other shutdown options which are not default. As a whole, the shutdown options set based on working hours can better meet users' purpose and provide a more intelligent service to the users than the prior art.

At step 712, according to the shutdown option or other operations selected by the user in the shutdown interactive window, subsequent operations are executed such as shutdown, restart, logout, standby, etc. or canceling the shutdown operation and returning to the running window of the operating system.

While the various steps of the computer-working-hours-based shutdown option setting method according to the embodiment of the present invention have been described above, it should be noted that the illustrated and described steps are only examples for describing the basic concepts of the present invention and enabling those skilled in the art to implement the present invention, and not a limitation to the present invention. In other embodiments of the computer-working-hours-based shutdown option setting method of the present invention, there may be more, less and different steps as compared to what is shown and described, and these steps can have a different execution order or can be executed in parallel, and these steps can be a further division of the steps shown and described or can be a combination of the steps shown and described. For example, step 704 of reading a shutdown option list from the memory, a step 705 of reading a computer working hours setting and step 706 of reading the current system time can have an order different from that shown and described or can be executed in parallel, etc. All these variations are within the spirit and scope of the present invention.

Figure 8:
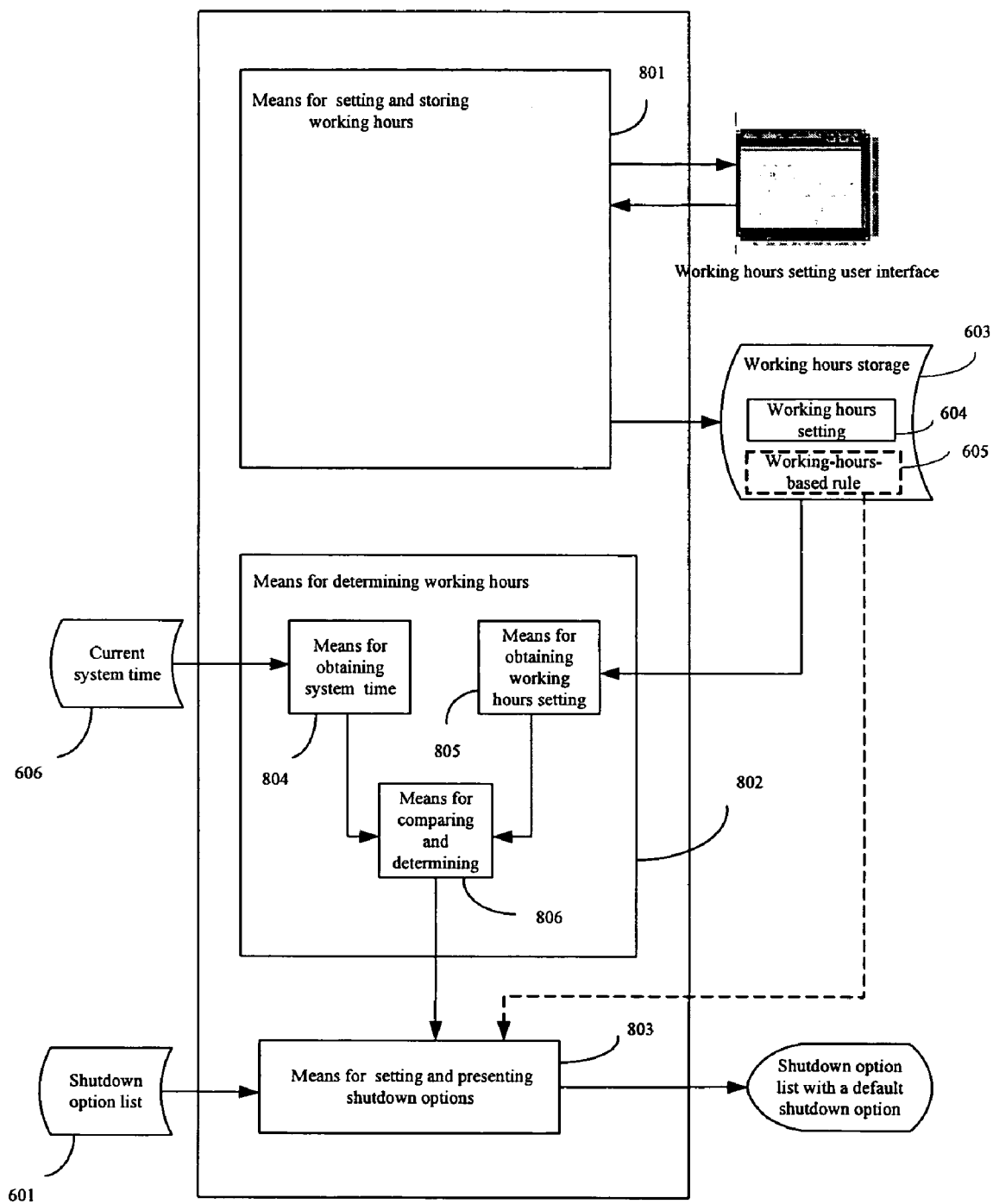
FIG. 8 shows a working-hours-based shutdown option setting apparatus according to the embodiment of the present invention.

FIG. 8 shows a working-hours-based shutdown option setting apparatus according to an embodiment of the present invention. In an embodiment of the present invention, the computer-working-hours-based shutdown option setting apparatus is implemented by the combination of the software functional modules 602 according to the present invention as shown in FIG. 6 and general-purpose computer components such as a CPU, a system memory, a system bus, I/O devices etc. That is, when the software functional modules 602 according to the present invention are loaded and executed by a computer, it and the various components of the computer together constitute the various functional modules in the computer-working-hours-based shutdown option setting apparatus according to the embodiment of the present invention as shown in FIG. 8 and perform the functions of the various functional modules.

As shown, the computer-working-hours-based shutdown option setting apparatus according to the embodiment of the present invention includes means for setting and storing working hours 801, means for determining working hours 802, and means for setting and presenting shutdown option 803.

Herein, the means for setting and storing working hours 801 is used for receiving from the user a setting for computer working hours, and storing the computer working hour setting 604 in a working hour storage 603 which may be contained in a permanent storage such as a hard disk. In an embodiment of the present invention, the means for setting and storing working hours 801 is further used to provide to the user a user interface for setting working hours, and is used for receiving from the user interface for setting working hours a setting for the computer working hours, and storing it into a working hours storage 603. The user interface for setting working hours is for example a window containing two time pickers, a "submit" button, and a "cancel" button. When the user selects desired times from the two time pickers and clicks the "submit" button, the time range defined by the two times is taken as the working hours of the computer and received and stored in the working hours storage 603 by the means for setting and storing working hours 801. In addition, a date picker and other editable controls can be provided in the window so as to perform more complicated customization on the computer working hours, for example, excluding legal holidays from the computer working hours, etc.

In an embodiment of the present invention, the means for setting and storing working hours 801 sends to the user a user interface for setting working hours in response to the clicking of a working hour setting button provided in a computer shutdown interface by the user.

In an embodiment of the present invention, the means for setting and storing working hours 801 is further used to provide to the user a user interface for setting a shutdown option setting rule based on working hours, and is used to receive from the user interface the working-hours-based shutdown option setting rule 605 set by the user, and store it into a working hours storage 604, so that the means for setting and presenting shutdown options 803 set and/or present a shutdown option list of the computer according to the stored working-hours-based shutdown option setting rule and the computer working hours setting.

The means for determining working hours 802 is used to, when the operating system receives a shutdown signal from a user, determine whether the current system time is within the set computer working hours according to the stored computer working hours setting, and provides the determination result to the means for setting and presenting shutdown options 803.

In an embodiment of the present invention, the means for determining working hours 802 comprises means for obtaining system time 804, means for obtaining working hours setting 805, and means for comparing and determining 806. Herein, the means for obtaining system time 804 is used to obtain current system time (for example, a function or command specific to the operating system can be invoked to obtain the current system time), and provide it to the means for comparing and determining 806. The means for obtaining working hours setting 805 is used to obtain from the working hours storage 603 the stored computer working hours setting 604, and provides it to the means for comparing and determining 806. The means for comparing and determining 806 is used to compare the current system time from the means for obtaining system time 804 with the working hours setting from the means for obtaining working hours setting 805 to determine whether the current system time is within the computer working hours and subsequently provide the determination result to the means for setting and presenting shutdown options 803.

The means for setting and presenting shutdown options 803 is used to obtain a shutdown option list 601 from the shutdown subsystem of the operating system, set and/or present the shutdown option list according to the determination result from the means for determining working hours 802, and provide the set and/or presented shutdown option list to the user.

In an embodiment of the present invention, when the determination result from the means for determining working hours 802 is that the current system time is within the set computer working hours, the means for setting and presenting shutdown options 803 set the default shutdown option as "restart", and provides the shutdown option list which has been set with the default shutdown option to the user; and when the determination result from the means for determining working hours 802 is that the current system time is out of the set computer working hours, the means for setting and presenting shutdown options 803 set the default shutdown option as "shutdown", and provides the shutdown option list which has been set with the default shutdown option to the user for subsequent operations.

In other embodiments of the present invention, the shutdown option presenting means 803 can perform other settings and/or presentation on the shutdown option list according to the determination result from the means for determining working hours 802, such as setting and/or presenting different shutdown options, etc.

In an alternative embodiment of the present invention, the means for setting and presenting shutdown options 803 is further used to obtain the working-hours-based shutdown option setting rule 605 from the working hours storage 603, set and/or present the shutdown option list 601 according to rule 605 and the determination result from the means for determining working hours 802, and provide the set and/or presented shutdown option list to the user for subsequent operations. In addition, the set shutdown option can be invoked directly by a process for installing the application program, in this way the shutdown setting needs not be changed during designing the installation program in the application program, thus simplifying the design of the installation program in the application program.

While the computer-working-hours-based shutdown option setting apparatus according to the embodiment of the present invention has been described above, it should be noted that the illustrated and described apparatus is only an example for describing the basic concepts of the present invention and enabling those skilled in the art to implement the present invention, and not a limitation to the present invention. In other embodiments of the present invention, the working-hours-based shutdown option setting apparatus of the present invention can have more, less and different functional modules as compared to what is shown and described, and relations such as inclusion and connection between various functional modules can be different from what is shown and described. For example, the working-hours-based shutdown option setting rule 605 can also be stored in a separate place, and the means for obtaining system time 804 and the means for obtaining working hours setting 805 can also be separate means outside the means for determining working hours 802, and so on. All these variations are within the spirit and scope of the present invention.

The present invention can also be embodied in a computer program product, which contains all the features enabling the implementation of the method described herein, which when being loaded in a computer system, can perform all the steps of the method.

While the present invention has been shown and described above particularly with reference to the embodiments, those skilled in the art will understand that various changes in form and detail can be made thereto without departing from the spirit and scope of the present invention, which is to be defined by the attached claims.

What is claimed is:

1. A method for setting computer-working-hours-based shutdown options, comprising:
   obtaining a computer working hours setting for a computer, wherein the computer working hours setting indicates working hours of the computer;
   in response to receiving a shutdown command from a user, determining, based on the computer working hours setting, whether a current system time of the computer is within the working hours of the computer; and
   performing, based on the determining, at least one of: setting a shutdown option of the computer and presenting a shutdown option of the computer to the user;
   wherein the shutdown option of the computer comprises:
      a restart of the computer when the current system time of the computer is within the working hours of the computer; and
      a shutdown of the computer when the current system time of the computer is not within the working hours of the computer.

2. The method according to claim 1, further comprising: receiving and storing the computer working hours setting.

3. The method according to claim 2, wherein the receiving and storing further comprises:
   providing to the user a user interface for setting the working hours of the computer; and
   receiving from the user interface and storing the computer working hours setting.

4. The method according to claim 1, wherein the determining further comprises:
   obtaining the current system time of the computer;
   obtaining the computer working hours setting from a memory of the computer; and
   comparing the current system time of the computer with the working hours of the computer indicated by the computer working hours setting.

5. The method according to claim 1, further comprising:
   receiving and storing a working-hours-based rule set by the user; and
   performing, based on the working-hours-based rule and the determining, at least one of setting a shutdown option of the computer and presenting a shutdown option to the user of the computer.

6. An apparatus for setting computer-working-hours-based shutdown options, comprising:
   a computer system, including:
   a system for obtaining a computer working hours setting for a computer, wherein the computer working hours setting indicates working hours of the computer;
   a system for, in response to receiving a shutdown command from a user, determining, based on the computer working hours setting, whether a current system time of the computer is within the working hours of the computer; and
   a system for performing, based on the determining, at least one of: setting a shutdown option of the computer and presenting a shutdown option of the computer to the user;
   wherein the shutdown option of the computer comprises:
      a restart of the computer when the current system time of the computer is within the working hours of the computer; and
      a shutdown of the computer when the current system time of the computer is not within the working hours of the computer.

7. The apparatus according to claim 6, further comprising:
   a system for receiving and storing the computer working hours setting.

8. The apparatus according to claim 7, wherein the system for receiving and storing is configured to:
   provide to the user a user interface for setting the working hours of the computer;
   receive from the user interface the computer working hours setting; and
   store the computer working hours setting.

9. The apparatus according to claim 7, wherein the system for receiving and storing is further configured to receive and store a working-hours-based rule set by the user; and wherein the system for performing is configured to perform, based on the working-hour-based rule and the determining, at least one of: setting a shutdown option of the computer and presenting a shutdown option to the user of the computer.

10. The apparatus according to claim 6, wherein the system for determining comprises:
    a system for obtaining the current system time of the computer;
    a system for obtaining the computer working hours setting from a memory of the computer; and
    a system for comparing the current system time of the computer with the working hours of the computer indicated by the computer working hours setting.

11. A computer program product stored on a non-transitory computer readable medium, which when executed, sets computer-working-hours-based shutdown options, the computer readable medium comprising program code for:
    obtaining a computer working hours setting for a computer, wherein the computer working hours setting indicates working hours of the computer;
    in response to receiving a shutdown command from a user, determining, based on the computer working hours setting, whether a current system time of the computer is within the working hours of the computer; and
    performing, based on the determining, at least one of: setting a shutdown option of the computer and presenting a shutdown option of the computer to the user;
    wherein the shutdown option of the computer comprises:
       a restart of the computer when the current system time of the computer is within the working hours of the computer; and
       a shutdown of the computer when the current system time of the computer is not within the working hours of the computer.

12. The computer program product according to claim 11, further comprising program code for:
    receiving and storing the computer working hours setting.

13. The computer program product according to claim 12, wherein the receiving and storing further comprises:
    providing to the user a user interface for setting the working hours of the computer; and
    receiving from the user interface and storing the computer working hours setting.

14. The computer program product according to claim 11, wherein the determining further comprises:
    obtaining the current system time of the computer;
    obtaining the computer working hours setting from a memory of the computer; and
    comparing the current system time of the computer with the working hours of the computer indicated by the computer working hours setting.

15. The computer program product according to claim 11, further comprising program code for:

receiving and storing a working-hours-based rule set by the user; and performing, based on the working-hours-based rule and the determining, at least one of setting a shutdown option of the computer and presenting a shutdown option to the user of the computer.

* * * * *